United States Patent [19]

Taniguchi et al.

[11] Patent Number: 5,438,443
[45] Date of Patent: Aug. 1, 1995

[54] LIQUID CRYSTAL DEVICE

[75] Inventors: Osamu Taniguchi; Shinjiro Okada, both of Kawasaki; Yutaka Inaba, Kawaguchi; Hitoshi Shindo; Hirofumi Shibata, both of Atsugi, all of Japan

[73] Assignee: Canon Kabushiki Kaisha, Tokyo, Japan

[21] Appl. No.: 294,603

[22] Filed: Aug. 23, 1994

Related U.S. Application Data

[63] Continuation of Ser. No. 5,406, Jan. 19, 1993, abandoned, which is a continuation of Ser. No. 652,494, Feb. 8, 1991, abandoned, which is a continuation of Ser. No. 344,446, Apr. 28, 1989, abandoned, which is a continuation of Ser. No. 919,379, Oct. 16, 1986, abandoned.

[30] Foreign Application Priority Data

Oct. 18, 1985 [JP] Japan ................. 60-233036

[51] Int. Cl.⁶ .................................... G02F 1/1339
[52] U.S. Cl. ................................ 359/81; 359/56; 359/76
[58] Field of Search ............. 350/334, 341, 350 S, 350/336, 333; 359/75, 76, 78, 81, 87, 56

[56] References Cited

U.S. PATENT DOCUMENTS

| | | | |
|---|---|---|---|
| 4,264,149 | 4/1981 | de Zwart et al. | 350/334 |
| 4,523,812 | 6/1985 | Penz | 350/334 |
| 4,634,228 | 1/1987 | Iwasaki et al. | 350/350 S |
| 4,639,089 | 1/1987 | Okada et al. | 350/341 |
| 4,641,922 | 2/1987 | Jacob | 350/334 |
| 4,664,480 | 5/1987 | Geary et al. | 350/350 S |
| 4,682,858 | 7/1987 | Kanbe et al. | 350/334 |
| 4,712,877 | 12/1987 | Okada et al. | 350/350 S |
| 4,720,173 | 1/1988 | Okada et al. | 350/344 |
| 4,737,018 | 4/1988 | Iwashita et al. | 350/336 X |
| 4,744,639 | 5/1988 | Tsuboyama | 350/350 S |
| 4,763,995 | 8/1988 | Katagiri et al. | 359/76 |

FOREIGN PATENT DOCUMENTS

| | | | |
|---|---|---|---|
| 0118015 | 9/1980 | Japan | 350/335 |
| 60-184227 | 9/1985 | Japan . | |

OTHER PUBLICATIONS

D. Williams and L. E. Davis, "Alignment of chiral smectic liquid crystals", Europhysics Journal, J. Phys. D: Appl. Phys. 19 (1986):L37–L41.

Clark, et al., "Submicrosecond Bistable Electro-optic Switching In Liquid Crystals", Appl. Phys. Lett., 36, pp. 899–901 (1980).

Primary Examiner—William L. Sikes
Assistant Examiner—Huy Mai
Attorney, Agent, or Firm—Fitzpatrick, Cella, Harper & Scinto

[57] ABSTRACT

A liquid crystal device comprising a pair of parallel base plates and a ferroelectric liquid crystal disposed between the base plates. One of the pair of parallel base plates is provided with a plurality of stepwise elevations disposed in the form of stripes, and has been implemented with a uniaxial orientation treatment in a direction parallel to the edges of the stepwise elevations. The stepwise elevation may be formed by a transparent electrode alone or in combination with an alignment control film disposed thereon. Because of the above features, alignment defects liable to develop from the edges of the elevations are removed.

6 Claims, 4 Drawing Sheets

LIQUID CRYSTAL DEVICE

This application is a continuation of application Ser. No. 08/005,406, filed Jan. 19, 1993, which is a continuation of application Ser. No. 07/652,494, filed Feb. 8, 1991, which is a continuation of application Ser. No. 07/344,446, filed Apr. 28, 1989, which is a continuation of application Ser. No. 06/919,379, filed Oct. 16, 1986, each now abandoned.

FIELD OF THE INVENTION AND RELATED ART

The present invention relates to a liquid crystal device, and in particular to a liquid crystal display device, a liquid crystal-optical shutter array, etc., and more particularly to a liquid crystal device having improved display and driving characteristics through improved initial alignment or orientation of liquid crystal molecules.

Hitherto, Clark et al have published a ferroelectric liquid crystal device (e.g., U.S. Pat. No. 4,367,924). In order for the ferroelectric liquid crystal device to show the desired driving characteristics, it is required that the ferroelectric liquid crystal disposed between a pair of parallel base plates has such a molecular arrangement that the molecules can effectively be switched between two stable states. For this purpose, it is required that there is formed a region (monodomain) wherein liquid crystal molecular layers in a chiral smectic phase are arranged perpendicularly to the base plate faces and accordingly the molecular axes are arranged almost in parallel with the base plate faces.

As a method for uniaxially aligning or orienting such a ferroelectric liquid crystal, there has been proposed a method wherein organic films or inorganic films provided with physical scratches or grooves as by rubbing or oblique vapor deposition are formed on base plate faces inside the liquid crystal cell to provide a molecular aligning characteristic similarly as in the conventional TN-type liquid crystal device. For example, according to the rubbing method, an organic polymer film is formed on a glass substrate provided with transparent electrodes and is rubbed in one direction with a cloth such as velvet to leave minute scratches or grooves, by which liquid crystal molecules are aligned.

While the rubbing method is an attractive method from an industrial viewpoint such as of productivity, there has sometimes been encountered a problem that a sufficient alignment state cannot be attained over a wide area and there result in alignment defects where the arrangement of liquid crystal molecules is disordered when a ferroelectric liquid crystal is aligned in a liquid crystal cell having a plurality of stripe-form transparent electrodes.

Especially when matrix electrodes are arranged at a high density on a substrate as will be described hereinafter, relatively thick electrodes (e.g., 800 Å–3000 Å) are required so as to lower the resistance thereof, so that there are formed stepwise elevations of 800 Å or more between the face of the substrate per se and the top faces of the electrodes. According to our experiments, it has been discovered that the stepwise elevations generate the alignment defects of a ferroelectric liquid crystal.

SUMMARY OF THE INVENTION

An object of the present invention is to provide a liquid crystal device using a ferroelectric liquid crystal, wherein an initial alignment state with a uniform monodomain is realized while suppressing the generation of alignment defects, thereby to provide improved display and driving characteristics.

As a result of our investigation of the cause of the above mentioned alignment defects, defects are liable to occur especially at the stepwise elevations due to the formation of stripe-form transparent electrodes on a base plate, and moreover, the state of the defects depends on the direction of a uniaxial orientation treatment applied to the base plate. More specifically, the present invention is based on a discovery that the generation of the alignment defects is minimized when a uniaxial orientation treatment such as rubbing is applied in a direction parallel to edge lines of stepwise elevations due to transparent electrodes, i.e., in the direction of extension of the stripe electrodes. The reason for the above effects is assumed to be as follows. When the direction of the uniaxial orientation treatment corresponds to the normal of the side walls of the stepwise elevations, a sufficient rubbing effect is not applied to a descending wall in the rubbing direction of the two walls of each transparent stripe electrode, so that a sufficient alignment, control force is not exerted to the liquid crystal molecules. Moreover, such a stepwise elevation provides a difference in liquid crystal layer thickness which also is liable to cause alignment defects. Accordingly, when a stepwise elevation provided with an insufficient orientation treatment effect is disposed so as to provide a difference in liquid crystal layer thickness, i.e., when a uniaxial orientation treatment is applied in a direction perpendicular to edges of stepwise elevations, alignment defects are liable to be developed.

DETAILED DESCRIPTION OF THE PREFERRED EMBODIMENTS

Figure 1:
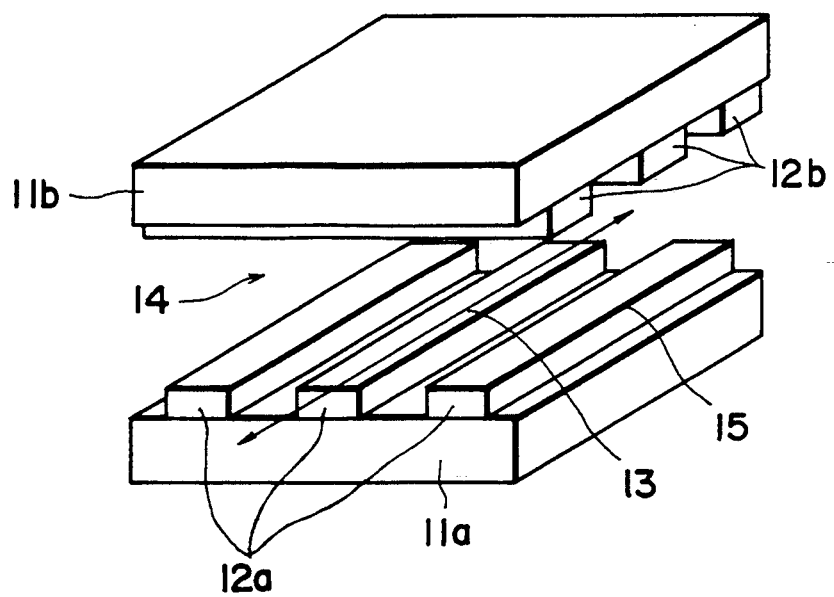
FIG. 1 is a schematic perspective view of a ferroelectric liquid crystal device according to the present invention.

FIG. 1 is a perspective for explaining the outline of a liquid crystal device according to the present invention.

The liquid crystal device shown in FIG. 1 comprises a pair of glass substrates 11a and 11b respectively provided with transparent electrodes 12a (of, e.g., ITO (indium tin oxide) film, or tin oxide film) and transparent electrodes 12b (of, e.g., ITO film or tin oxide film) each disposed in the form of stripes of 800–3000 Å in thickness so that the stripe transparent electrodes face each other perpendicularly. Between the glass substrates 11a and 11b is disposed by injection a ferroelectric liquid crystal 14 showing ferroelectricity in a chiral smectic phase, preferably in a chiral smectic phase of which the spiral structure has been released or lost. The base plate (which may be referred to as base plate 11a) including the glass substrate 11a and the stripe transparent electrodes 12a has been subjected to a uniaxial orientation treatment such as rubbing in a direction 13 parallel to the edges 15 of the stripe electrodes constituting stepwise elevations against the liquid crystal 14.

Figure 2A:
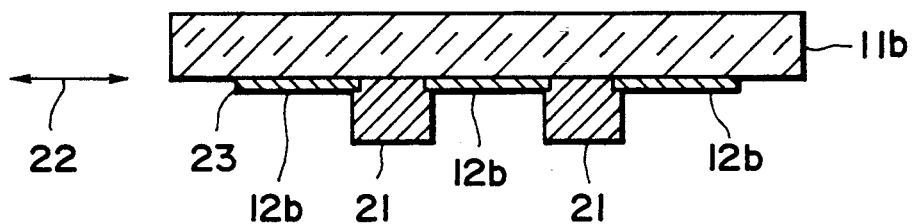
FIG. 2A is a schematic sectional view of one base plate used in a ferroelectric liquid crystal device according to the present invention.
Figure 2B:
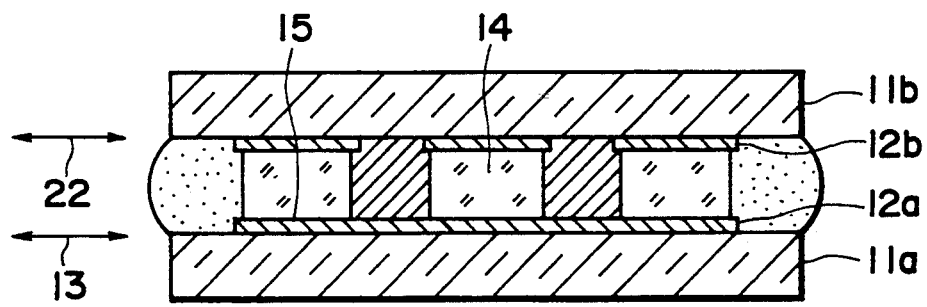
FIG. 2B is a schematic sectional view of the liquid crystal device.

In a preferred embodiment according to the present invention, the other base plate (which may be referred to as base plate 11b) including the glass substrate 11b may be one from which elevations causing a difference in liquid crystal layer thickness has been removed. FIG. 2A shows such a preferred base plate including the substrate 11b, and FIG. 2B shows a liquid crystal device incorporating the base plate. On the substrate 11b, stripe transparent electrodes 12b are disposed so as to perpendicularly intersect with the stripe transparent electrodes 12a formed on the substrate 11a. Further, spacer members 21 are disposed so as to cover the whole gap between each adjacent pair of electrodes. By disposing the spacer members 21 (illustrated as stripe-shaped projections) to cover the whole gaps between the stripe electrodes, stepwise elevations given by electrodes can be cancelled to avoid a difference in liquid crystal layer thickness. As a result, even if a uniaxial orientation axis is provided by rubbing in a direction 22 perpendicular to the edges 23 of the stripe transparent electrodes 12b (parallel to the uniaxial orientation axis 13 provided to the substrate 11a), no alignment defects occur thereby because no stepwise elevation is present on the substrate 11b.

Further, in the present invention, a good alignment state may be obtained even if one base plate like the base plate 11b shown in FIG. 2A has not been subjected to a uniaxial orientation treatment, and therefore, a rubbing treatment may be omitted with respect to the base plate 11b. Further, it is also possible to select the uniaxial orientation axis 22 so that it forms an intersection angle of less than 90°, e.g., 10°–60°, with the uniaxial orientation axis 13 provided to the base plate 11a.

In a preferred embodiment according to the present invention, various kinds of alignment control film may be formed on a base plate to which a uniaxial orientation treatment is to be applied (e.g., the base plate 11a), and then a uniaxial orientation treatment such as rubbing may be applied to the alignment control film. The material constituting the alignment control film may preferably be selected from resins such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin and acrylic resin; photosensitive polyimide, photosensitive polyamide, cyclic rubber type photoresist, phenol novolak type photoresist, and electron beam resists (such as polymethyl methacrylate, epoxidized-1,4-polybutadiene), and formed into a film.

In preparing the liquid crystal device according to the present invention, it is necessary to control the spacing between the base plates 11a and 11b. It is particularly preferred to provide a sufficiently small spacing so as to release the spiral structure of a chiral smectic phase. Appropriate spacer members 21 disposed between the base plates 11a and 11b to uniformize the spacing over the whole area. In this instance, as shown in FIGS. 2A and 2B, it is preferred to dispose stripe spacer members 21b so as to cover the respective gaps between the stripe transparent electrodes 12b on the base plate 11b. As the height or thickness of the spacer members 21 determines the thickness of the ferroelectric liquid crystal layer 14, it may vary depending on the kind of a liquid crystal material used and a required response speed, but it may generally be set in the range of 0.2 to 20 $\mu$, preferably in the range of 0.5 to 10 $\mu$. Further, in another embodiment according to the present invention, the spacer members may be composed of glass fiber, alumina beads, etc., instead of the above mentioned stripe spacers.

In the liquid crystal device according to the present invention, if an AC field is applied to a ferroelectric liquid crystal 14 which has been aligned in a bistability condition in advance and prior to actual driving, a display driving can be accomplished without alignment defects and with an improved contrast. The AC electric field applied for this purpose may comprise a voltage of 10–100 V, and a frequency of 10–100 Hz and may be applied for several seconds to several minutes.

The ferroelectric liquid crystal used in the present invention may be various ones but may preferably be one showing cholesteric phase at a temperature higher than that providing chiral smectic phase. Specific examples thereof include the following:

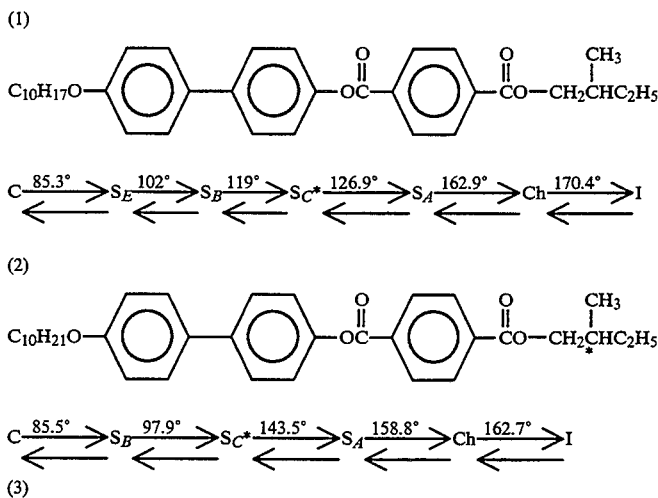

(1)

(2)

(3)

-continued

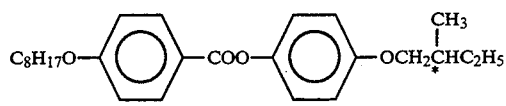

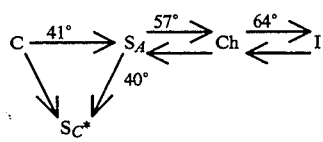

In the above, the respective symbols represent the following phases:

C: crystal phase, $S_C^*$: chiral smectic C phase, $S_A$: smectic A phase, $S_B$: smectic B phase, $S_E$: smectic E phase, Ch: cholesteric phase, and I: isotropic phase.

Figure 3:
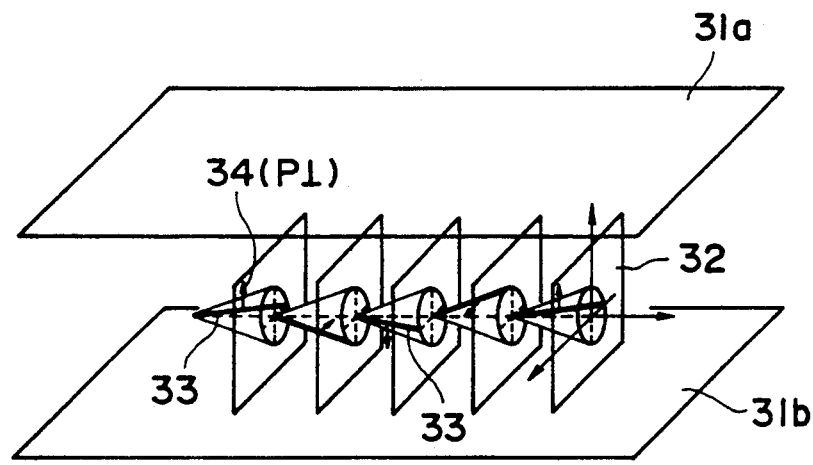
FIGS. 3 and 4 are respectively schematic and perspective views for explaining operation principle of the ferroelectric liquid crystal device according to the present invention.

Referring to FIG. 3, there is schematically shown an example of a ferroelectric liquid crystal cell for explanation of the operation thereof. Reference numerals 31a and 31b denote base plates each comprising a substrate (glass plate) and stripe electrodes of, e.g., $In_2O_3$, $SnO_2$ or ITO (indium tin oxide) film of 800–3000 Å disposed thereon forming stepwise elevations against a liquid crystal layer hermetically disposed therebetween. The liquid crystal is in a chiral smectic phase such as SmC* or SmH* in which liquid crystal molecular layers 32 are oriented perpendicular to the surfaces of the glass plates. Full lines 33 show liquid crystal molecules. Each liquid crystal molecule 33 has a dipole moment (P⊥) 34 in a direction perpendicular to the axis thereof. When a voltage higher than a certain threshold level is applied between electrodes formed on the base plates 31a and 31b, a helical structure of the liquid crystal molecule 23 is unwound or released to change the alignment direction of respective liquid crystal molecules 33 so that the dipole moments (P⊥) 34 are all directed in the direction of the electric field. The liquid crystal molecules 33 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 4:
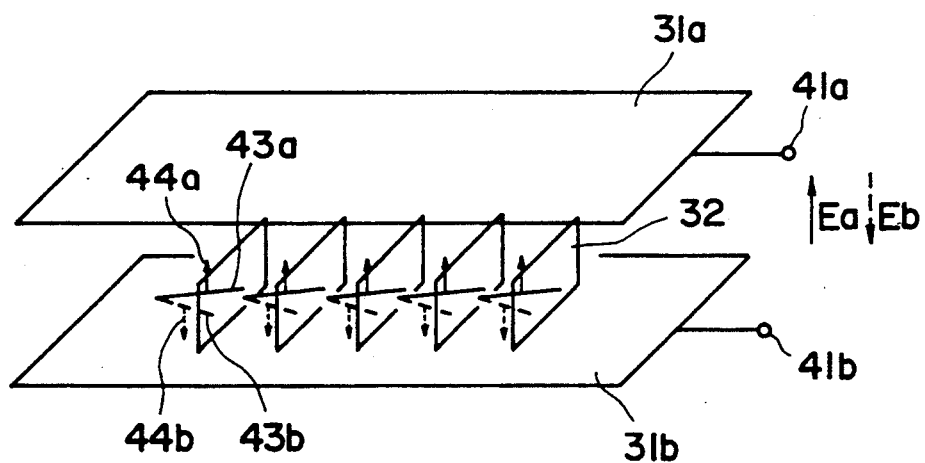

The liquid crystal layer preferably used in the liquid crystal device of the present invention may be rendered sufficiently thin in thickness (e.g., less than 10 μ). As the thickness of the liquid crystal layer is decreased, the helical structure of the liquid crystal molecules is unwound to provide a non-helical structure even in the absence of an electric field whereby the dipole moment assumes either of the two states, i.e., Pa in an upper direction 44a or Pb in a lower direction 44i b l as shown in FIG. 4. When electric field Ea or Eb higher than a certain threshold level and different from each other in polarity as shown in FIG. 4 is applied to a cell having the above-mentioned characteristics from voltage application means 41a and 41b, the dipole moment is directed either in the upper direction 44a or in the lower direction 44b depending on the vector of the electric field Ea or Eb. In correspondence with this, the liquid crystal molecules are oriented to either a first stable state 43a or a second stable state 43b.

When the above-mentioned ferroelectric liquid crystal is used as an optical modulation element, it is possible to obtain two advantages as briefly mentioned hereinbefore. First is that the response speed is quite fast. Second is that the orientation of the liquid crystal shows bistability. The second advantage will be further explained, e.g., with reference to FIG. 4. When the electric field Ea is applied to the liquid crystal molecules, they are oriented to the first stable state 43a. This state is stable even if the electric field is removed. On the other hand, when the electric field Eb of which direction is opposite to that of the electric field Ea is applied thereto, the liquid crystal molecules are oriented to the second stable state 43b, whereby the directions of molecules are changed. This state is similarly retained stably even if the electric field is removed. Further, as long as the magnitude of the electric field Ea or Eb being applied is not above a certain threshold value, the liquid crystal molecules are placed in the respective orientation states. In order to effectively realize the high response speed and bistability, it is preferable that the thickness of the cell is as thin as possible.

Example 1

On a glass plate having ITO stripe electrodes with a thickness of 1500 Å and a width of 50 μ formed with a spacing of 12.5 μ (16 lines/mm) thereon, a polyimide-forming solution ("PIQ" produced by Hitachi Kasei Kogyo K. K.; non-volatile matter content: 14.5 wt. %) was applied so as to form a 2 μ-thick polyimide film.

Then, on the polyimide film, a positive-type resist solution ("AZ 1350" produced. by Shipley Co. ) was applied to form a resist layer, and a stripe mask having a masking stripe width of 12.5 μ with a spacing of 50 μ was disposed on the resist layer so that its masking portions aligned with the entirety of the gaps between the ITO electrodes, and was subjected to light exposure. Then, the resist film and the polyimide film at the exposed portions were removed by development with a developer liquid ("MF 312") containing tetramethylammonium hydroxide, the remaining resist film was then removed, and the polyimide film was heat-cured under the prescribed conditions to form spacer members completely covering the gaps between the ITO stripe electrodes. Then, an 800 Å-thick film of a polyimide Substantially the same as described above was uniformly formed to cover the electrodes and the spacers. After that, a rubbing treatment was applied in a direction perpendicular to the extension of the edges of the stripe spacers to prepare an electrode plate A.

Separately, on a glass plate having ITO stripe electrodes with a thickness of 1500 Å and a width of 50 μ formed with a spacing of 12.5 μ, the above mentioned polyimide forming solution ("PIQ") was applied and cured to form an 800 Å-thick polyimide film. Then, a rubbing treatment was applied in a direction parallel to the edges of the ITO stripe electrodes to form an electrode plate B.

Then, the thus prepared two electrodes were superposed with each other so that their ITO stripe patterns crossed each other at right angles and their rubbing directions were parallel with each other, and the periphery thereof was sealed up with an epoxy adhesive while leaving an injection port. Into a blank cell thus prepared, the above mentioned liquid crystal (1) showing a chiral smectic phase but in the isotropic phase was introduced through the injection port. After the sealing of the injection port, the resultant cell was gradually cooled at a rate of 0.5° C./hr to form chiral smectic C phase in the cell.

Figure 5A:
FIG. 5A is a microscopic photograph of a ferroelectric liquid crystal device prepared in Example 1.
Figure 5B:
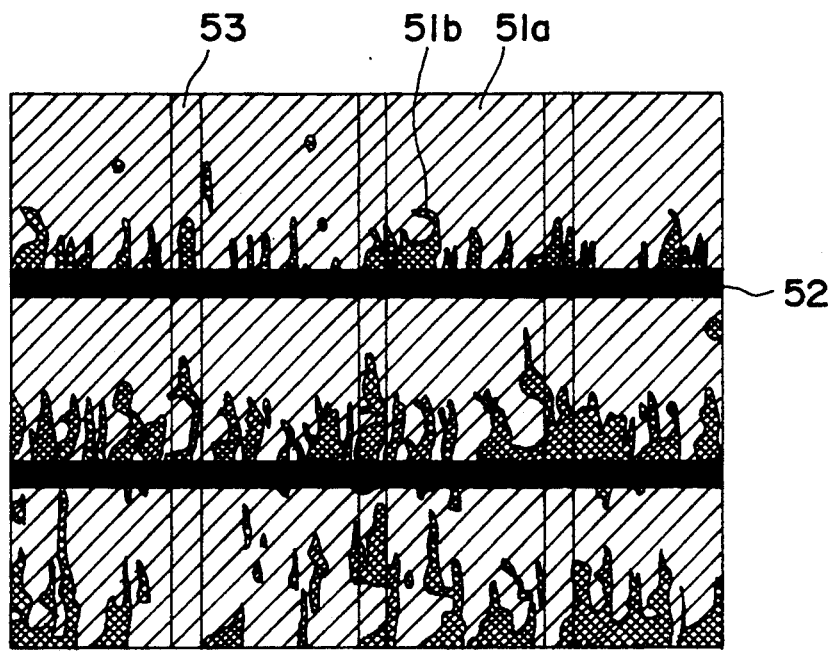
FIG. 5B is a sketch thereof.

The thus prepared ferroelectric liquid crystal device was observed and photographed through a polarizing microscope. FIG. 5A is a photograph (×80) thus taken and FIG. 5B is a sketch thereof wherein reference numerals 51a and 51b respectively denote a portion of the liquid crystal in the chiral smectic C phase assuming a stable state; 52, a spacer member in the form of a stripe; and 53, a spacing between the transparent stripe electrodes. As shown in these figures, the formation of a monodomain of SmC* wherein the portions 51a and 51b assuming two stable states were co-present, was confirmed as an initial alignment. Thus, while there were present stepwise elevations due to the 1500 Å-thick ITO stripes, no alignment defects were observed. The thus prepared liquid crystal cell was subjected to switching by application of pulse voltages of ±20 V and 500 μsec, whereby a good switching characteristic between the two stable states was confirmed.

Further, by pre-application of an AC electric field of 20 volts and 20 Hz between the electrodes for 10 seconds there was observed an increase in display contrast of the liquid crystal cell.

Comparative Example 1

An electrode plate B1 was prepared in the same manner as the electrode plate B except that a rubbing treatment was applied in a direction perpendicular to the extension of the ITO stripe. A ferroelectric liquid crystal device was prepared by using the electrode plate B1 instead of the electrode B and otherwise following the procedure of Example 1.

Figure 6A:
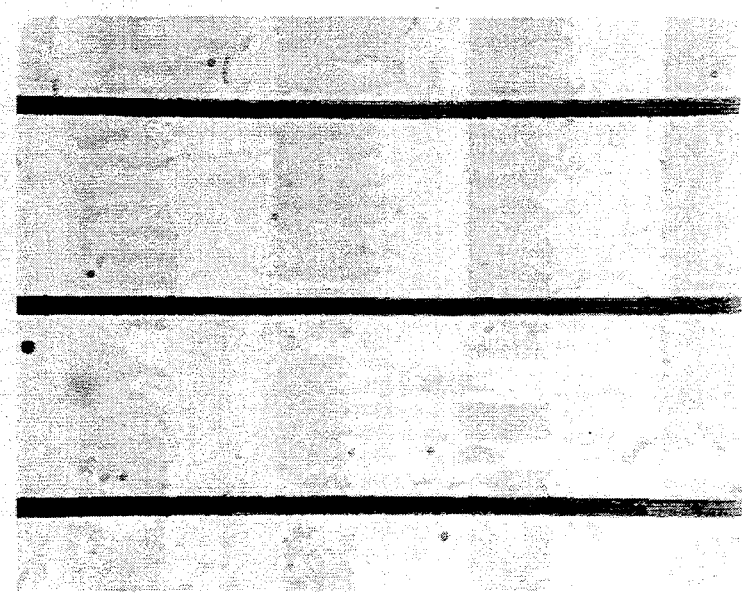
FIG. 6A is a microscopic photograph of a ferroelectric liquid crystal device prepared in Comparative Example 1.
Figure 6B:
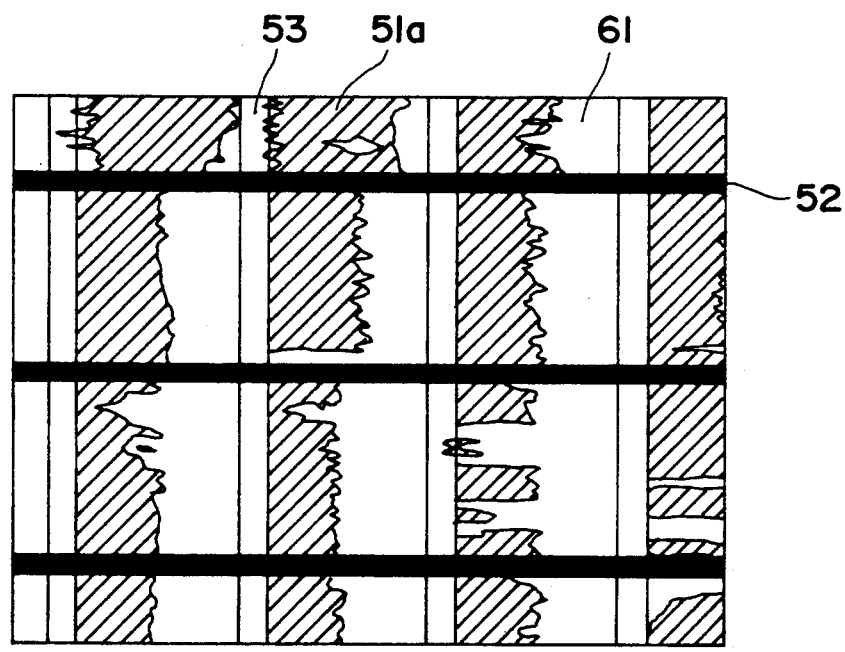
FIG. 6B is a sketch thereof.

The liquid crystal device for comparison thus prepared was observed and photographed in the same manner as in Example 1. FIG. 6A is a photograph (×80) thus taken, and FIG. 6B is a sketch thereof wherein the same reference numerals denote the same kind of portions or members as in FIG. 5B. As shown in these figures, portions 61 wherein alignment of liquid crystal molecules was disordered presumably because of orientation defects were observed along one side each of the electrode edges, and in addition to the alignment disorder portions 61, only liquid crystal regions 51a wherein liquid crystal molecules assumed one stable state were observed. This means that the portions 51a had a rather monostable characteristic. When this cell was subjected to a switching operation as in Example 1, the liquid crystal regions 51a could be switched between two states but the portions 61 could not be effectively switched.

Example 2

Example 1 was repeated except that a polyvinyl alcohol film was used instead of the polyimide film for the preparation of the electrode plate B, whereby results similar to those in Example 1 were obtained.

Example 3

An electrode plate provided with a 1500 Å-thick ITO transparent electrode film on one entire surface thereof, and PIQ used in Example 1 was applied entirely onto the electrode film and cured to form a polyimide film. Then, the polyimide film was rubbed in one direction with velvet to provide an electrode plate C.

Alumina beads with an average particle size of 1.5 μ were dispersed on the electrode plate C. Thereon, the electrode plate B used in Example 1 was superposed so that their rubbing directions were parallel with each other. After the electrode plates B and C were secured to each other with an epoxy adhesive disposed at the periphery. Into the cell thus prepared, the above mentioned liquid crystal (1) was injected.

The cell was observed in the same manner as in Example 1, whereby no alignment defects were observed.

Comparative Example 2

A liquid crystal cell was prepared in the same manner as in Example 3 except that the electrode plate B1 as used in Comparative Example 1 was used instead of the electrode plate B, and observed in the same manner as in Example 1, whereby inappropriate alignment portions attributable to orientation defects similar to those shown in FIG. 6 were observed.

As described above, according to the present invention, there is provided a ferroelectric liquid crystal device with a good initial alignment state free of alignment defects, and by preliminarily applying an AC electric field to the ferroelectric liquid crystal under bistability condition prior to display driving, a display with an ! improved contrast is realized.

What is claimed is:

1. A liquid crystal device, comprising:
   a pair of substrates each having thereon a plurality of stripe-shaped transparent electrodes having a thickness of 800–3,000 Å, said electrodes intersecting each other with a space therebetween, one of the substrates being provided with a uniaxial orientation treatment parallel to the stripe-shaped transparent electrodes thereon, and the other substrate being free from a uniaxial orientation treatment; and
   a chiral smectic liquid crystal disposed in the space between said transparent electrodes;
   said liquid crystal further comprising means for providing prior to display driving an AC-voltage sufficient to increase display contrast.

2. A liquid crystal device according to claim 1, wherein said uniaxial orientation treatment is rubbing treatment.

3. A liquid crystal device according to claim 1, wherein said pair of substrates are disposed with a spacing therebetween small enough to suppress the formation of a helical structure of the chiral smectic liquid crystal.

4. A liquid crystal device according to claim 1, wherein said one of the pair of substrates provided with a uniaxial orientation treatment is provided with an alignment control film.

5. A liquid crystal device according to claim 1, wherein said alignment control film comprises a resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, photosensitive polyimide, photosensitive polyamide, cyclic rubber type photoresist, phenol novolak type photoresist, and electron beam resists.

6. A liquid crystal device according to claim 1, further comprising a spacer material within said space between said tramsparent electrodes.

* * * * *

UNITED STATES PATENT AND TRADEMARK OFFICE
CERTIFICATE OF CORRECTION

PATENT NO. : 5,438,443
DATED : August 1, 1995
INVENTOR(S) : OSAMU TANIGUCHI ET AL.          Page 1 of 2

It is certified that error appears in the above-identified patent and that said Letters Patent is hereby corrected as shown below:

COLUMN 1

Line 21, "et al" should read --et al.--.
    Line 50, "of" should be deleted.

COLUMN 2

Line 10, "above mentioned" should read
            --above-mentioned--.
    Line 60, "perspective" should read --perspective view--.

COLUMN 3

Line 16, "has" should read --have--.

COLUMN 4

Line 19, "disposed" should read --are disposed--.
    Line 33, "above" should read --above- --.

COLUMN 5

Line 37, "molecule 23" should read --molecule 33--.
    Line 60, "direction 44i b 1" should read
            --direction 44b--.

COLUMN 6

Line 60, "Sub-" should read --sub- --.
    Line 68, "above mentioned" should read
            --above-mentioned--.

UNITED STATES PATENT AND TRADEMARK OFFICE
CERTIFICATE OF CORRECTION

PATENT NO. : 5,438,443

DATED : August 1, 1995

INVENTOR(S) : OSAMU TANIGUCHI ET AL.

It is certified that error appears in the above-identified patent and that said Letters Patent is hereby corrected as shown below:

COLUMN 7

Line 12, "above mentioned" should read --above-mentioned--.
Line 59, "Of" should read --of--.

COLUMN 8

Line 19, ". After" should read --and--.
Line 21, "above men-" should read --above-men- --.
Line 39, "an!" should read --an--.

COLUMN 9

Line 1, "claim 1," should read --claim 4,--.

COLUMN 10

Line 6, "tramsparent" should read --transparent--.

Signed and Sealed this

Twenty-first Day of May, 1996

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,438,443

DATED : August 1, 1995

INVENTOR(S): OSAMU TANIGUCHI ET AL.

It is certified that error appears in the above-identified patent and that said Letters Patent is hereby corrected as shown below:

COLUMN 8

Line 54, "liquid crystal" should read --liquid crystal device--.

Signed and Sealed this

Twenty-seventh Day of August, 1996

Attest:

BRUCE LEHMAN

Attesting Officer        Commissioner of Patents and Trademarks